Feb. 13, 1923.
T. MORINELLI
RESILIENT WHEEL
Filed July 6, 1922
1,445,536
4 sheets-sheet 3
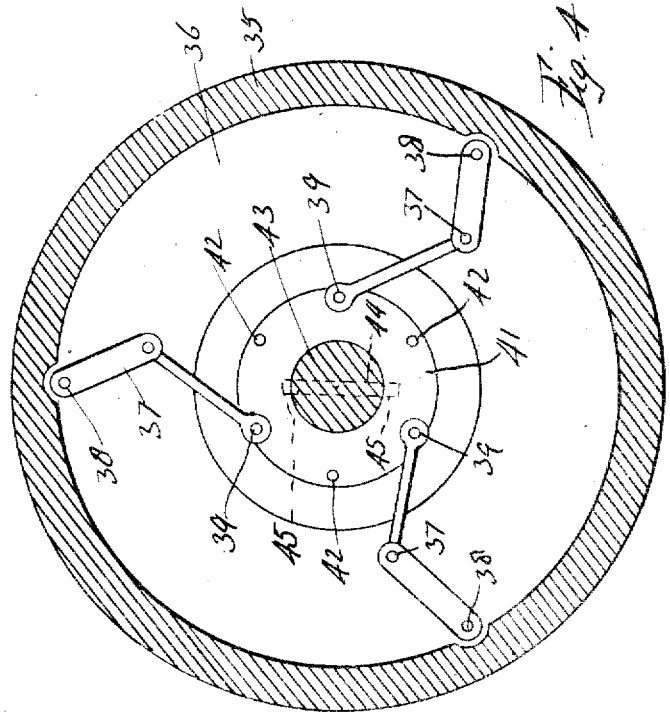
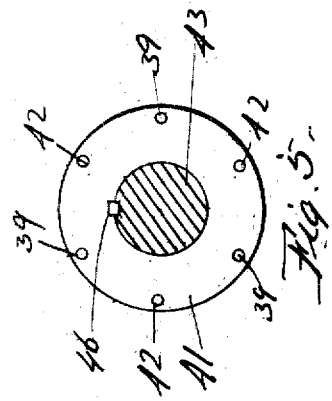
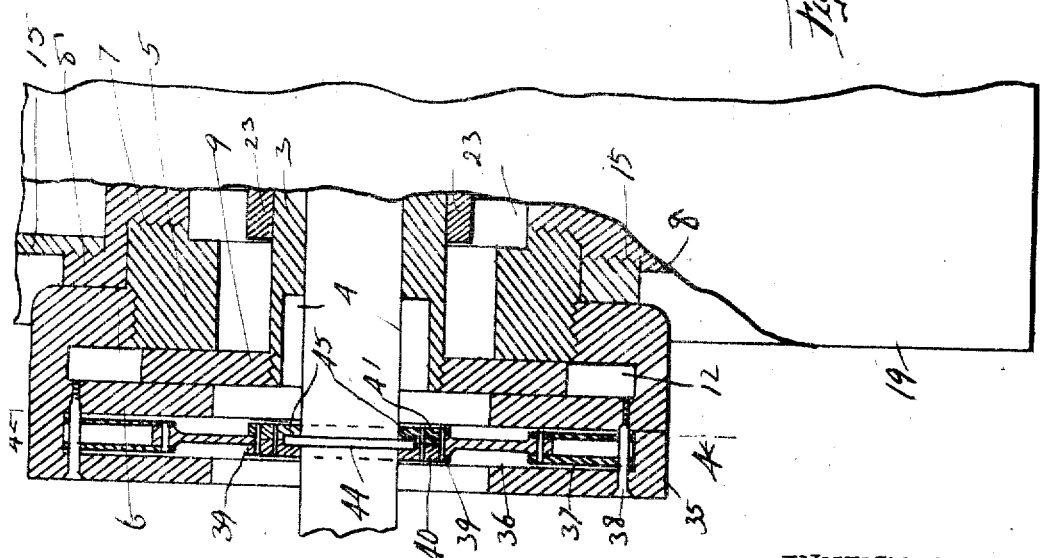
INVENTOR
Thomas Morinelli
By W. W. Williamson Atty.

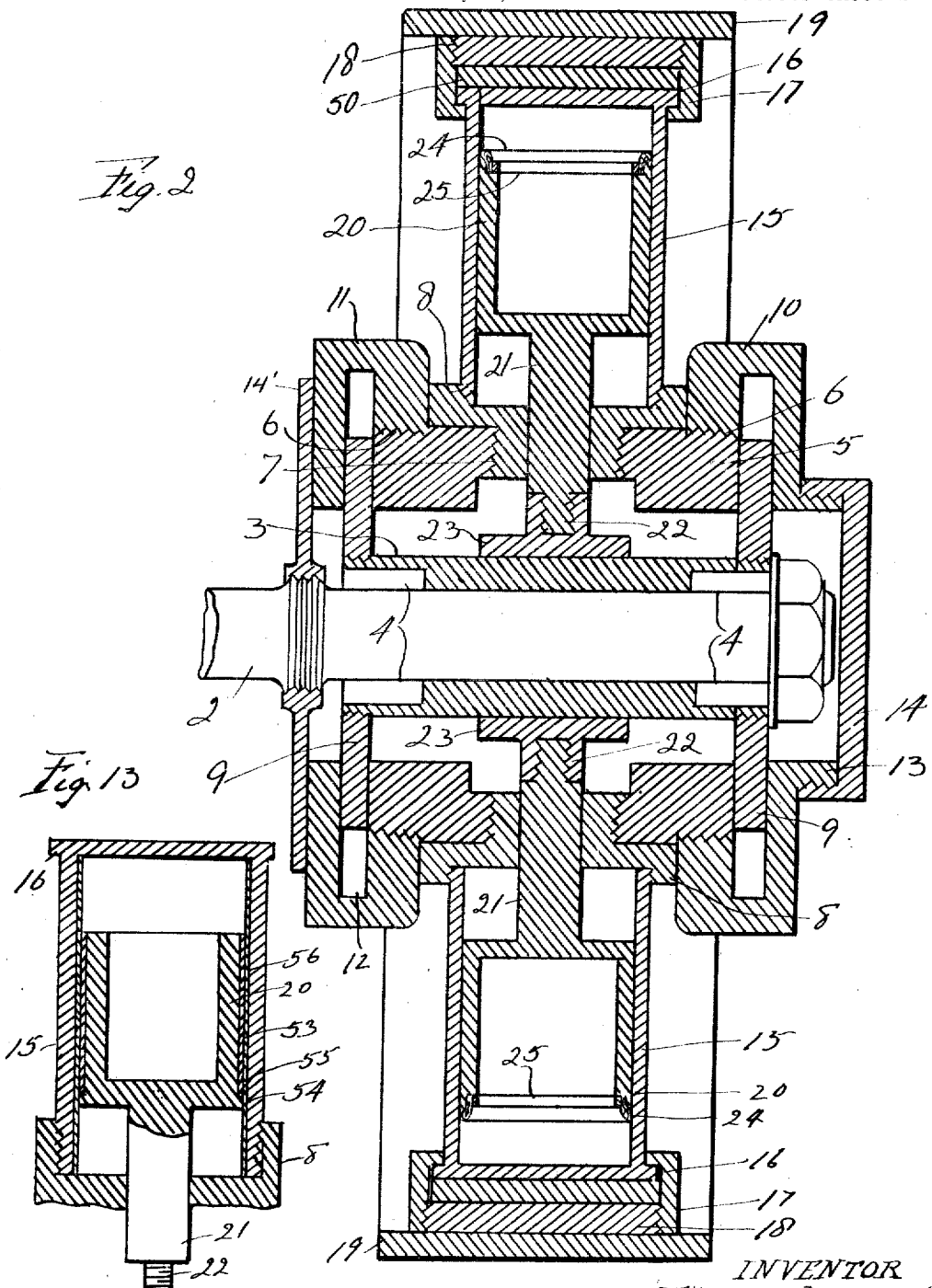

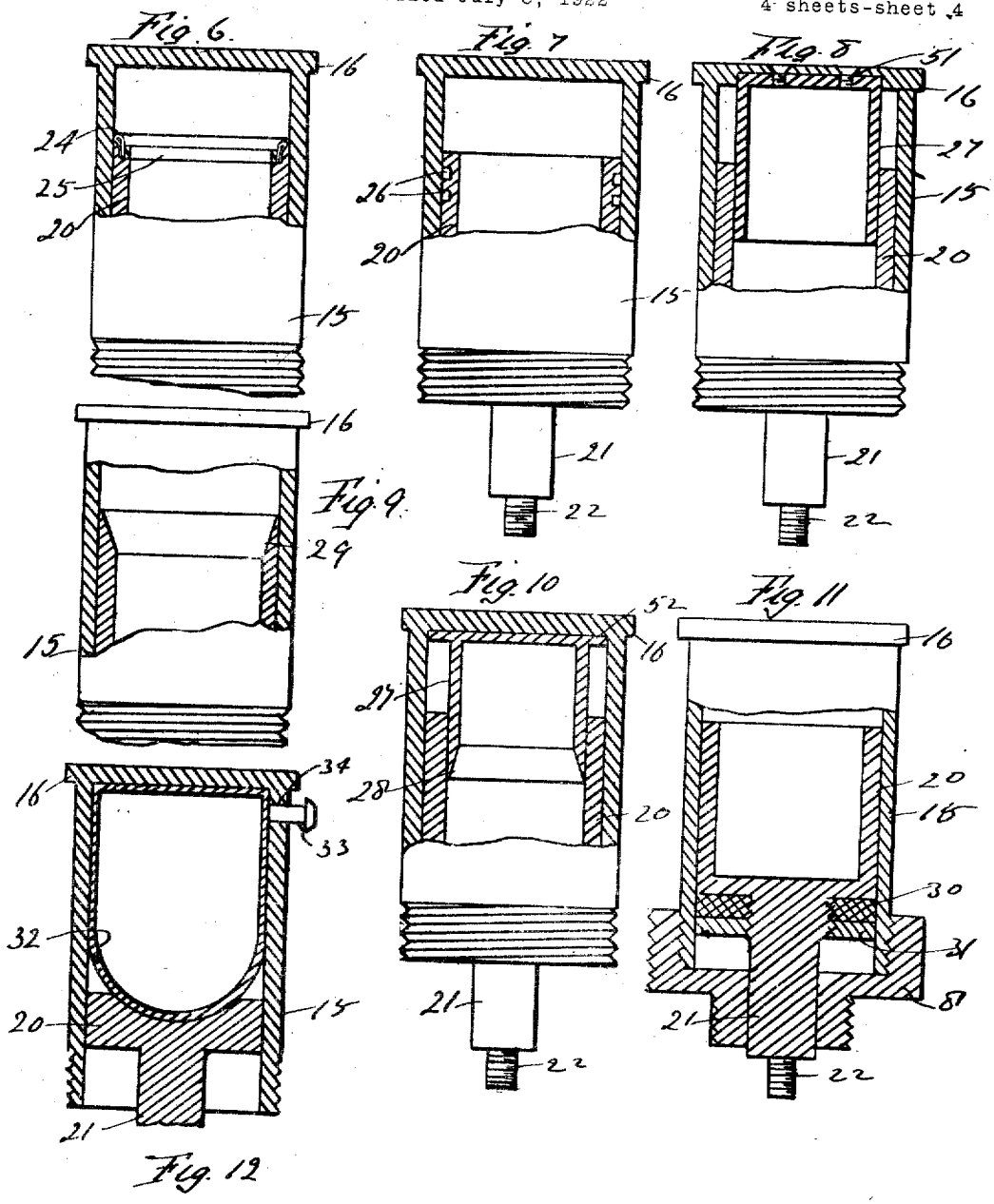

Patented Feb. 13, 1923.

1,445,536

UNITED STATES PATENT OFFICE.

THOMAS MORINELLI, OF PHILADELPHIA, PENNSYLVANIA.

RESILIENT WHEEL.

Application filed July 6, 1922. Serial No. 573,097.

*To all whom it may concern:*

Be it known that I, THOMAS MORINELLI, a subject of the King of Italy (having applied for his second papers as a citizen of the United States), residing at Philadelphia, in the county of Philadelphia and State of Pennsylvania, have invented new and useful Improvements in a Resilient Wheel, of which the following is a specification.

My invention relates to new and useful improvements in a resilient wheel, and has for its object to provide a structure in which air containers are interposed between the wheel hub and rim to absorb the shocks incident to running over obstructions or unevenness in a road bed and thereby eliminating the necessity of using pneumatic tires and the disadvantages arising from the use of such tires.

Another object of the invention it to provide for such a device an air container in the form of a cylinder with a piston working therein said cylinder and piston being positive in their action and arranged or constructed in such a manner as to reduce to a minimum the likelihood of leakage.

A further object of my invention is to provide a unique construction and arrangement of elements for transmitting rotary motion to a wheel having a rim capable of diametrical movement relative to its hub.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 2, is a diametrical sectional view thereof illustrating the construction particularly adapted for use as a front wheel or one that does not receive its power from a motor.

Fig. 3, is a fragmentary sectional elevation illustrating a construction particularly adapted for use as a rear wheel or one in which power is transmitted thereto from a motor.

Fig. 4, is a section at the line 4—4 of Fig. 3.

Fig. 5, is a detail face view of a connecting member showing a different manner of fastening the same to the axle which is illustrated in section.

Fig. 6, is a sectional side elevation of one form of air container.

Fig. 7, is a similar view of another form of container.

Fig. 8, is a similar view of another formation.

Fig. 9, is a similar view of a further modification.

Fig. 10, is a similar view of a further modified form of air container.

Fig. 11, is also a similar view of a different formation.

Figure 1:
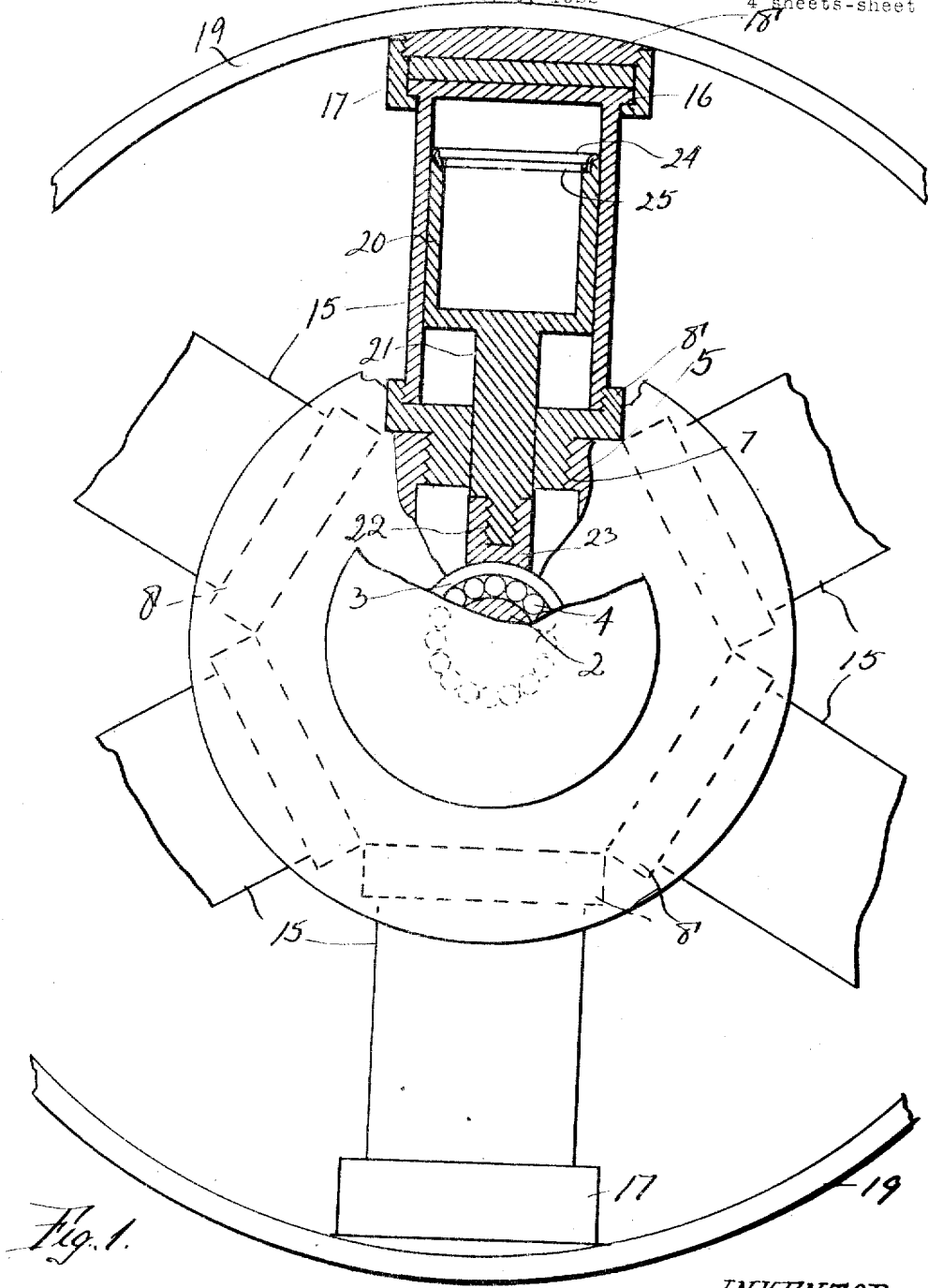
Fig. 1, is a fragmentary sectional elevation of a wheel embodying my invention.

Fig. 12, likewise is a similar view of a still different form of the device.

Fig. 13, is a vertical sectional view of another formation of air container.

In carrying out my invention as here embodied, 2 represents an axle surrounded by a tube 3 with suitable anti-friction devices interposed between them said devices being here shown as roller bearings, but it will be obvious that equivalents may be utilized, such as ball bearings. Surrounding the tube is a barrel 5 open at both ends and having exterior threads 6 at said ends while intermediate the ends of said barrel are formed a number of holes 7 whereby threaded connection for the sockets 8 may be had with the barrel 5.

On the ends of the tube 3 are threaded the flanges 9 which engage the ends of the barrel thus maintaining it against endwise movement independent of the tube while permitting said barrel to move about within the space between the flanges.

On each end of the barrel 5 is threaded a collar 10 and 11 each of which has a circular groove 12 for registration with the flanges 9, the said grooves being of a greater diameter than the flanges to permit of considerable diametrical movement of one part relative to the other and one of these collars, as 10, is preferably provided with a rim 13 whereby a cap 14 may have threaded connection therewith to keep out dirt or other foreign matter from the operating parts, while the other end of the hub is covered by a suitable disc 14' having threaded connection with the axle 2 or a portion of the brake housing as in use at the present time.

In each of the sockets 8 is threaded a cylinder 15 having a flange 16 at its outer end adapted to be engaged by a union nut 17 which in turn has threaded connection with a lug 18 projecting from the inner surface of the wheel rim 19.

Within the cylinder is slidably mounted a cup shaped piston 20 having a rod 21 integral therewith which passes through the socket 8 and has a reduced stem 22 for threaded connection with a thrust block 23 having an arcuate bearing surface as shown in Fig. 1 for contact with the exterior surface of the tube 3 but is not attached to said tube in any manner whatever.

In order to provide for the removal of the cylinders 15 a shim 50 of a thickness substantially equal to the depth of the threaded connection of said cylinder with the socket is interposed between the outer end of the cylinder and the lug 18 thereby permitting the cylinder to be disengaged from its socket after the union nut has been backed off and the shim removed.

The joints between the piston cylinder may be packed by the use of oil, tallow or other suitable greases or liquids to prevent the leakage of air during compression or if found desirable the piston is held in place by a ring 25 set in said groove, as shown in Fig. 6, and in some cases it may be found desirable to use piston rings 26 set in the exterior of the piston as shown in Fig. 7.

In Fig. 8, I have shown another construction of air container wherein a secondary or supplementary cylinder 27 is utilized and this supplementary cylinder is attached to the outer closed end of the main cylinder 15 by means of suitable fastening devices 51 such as screws or their equivalent with its walls concentric with the walls of the cylinder 15 but spaced therefrom so that one end of the supplementary cylinder closed and the open end thereof fits into the cup shaped piston. In Fig. 10, I have shown the open end of the supplementary piston as having an internal bevel 28 and its closed end is provided with an external flange 52 which snugly fits and is forced into the bore of the cylinder 15.

Fig. 9 shows a piston having an internally beveled outer or open end 29.

In Fig. 11 the piston is packed at its inner end by placing a compressible washer 30 over its rod and forcing it against the outer face of the inner or closed end of said piston by means of a washer 31 having threaded connection with the piston rod, it being understood that the compressible washer 30 snugly fits within the cylinder 15.

Fig. 12 illustrates the use of an air bag 32 which is housed within the cylinder and which may be filled with air by any suitable compression device or pump through the medium of a suitable valved nipple 33 constructed similar to any ordinary or well known tire valve which projects through a hole 34 in one of the walls of the cylinder.

In Fig. 13, a liner 53 is fitted within the cylinder 15 with one end resting against the inner end of said cylinder while the other end is engaged by the socket 8 so that said liner will be retained in place. The piston 20 has its major portion reduced in circumference so as to leave a flange 54 at its closed end thus producing a shoulder 55 against which rests one end of a jacket 56 on the reduced portion of the piston. By this arrangement the walls of the cylinder and piston will not be worn by the operations of the piston but any wear due to said operations will be upon the jacket and liner, either or both of which may be readily replaced by new ones when worn to such an extent that leakage of air might occur between them.

In Figs. 3 and 4, I have shown a construction particularly adapted for use with a rear wheel or one which is driven by a motor and in such a wheel a collar 35 is substituted for the collar 11 and this collar 35 has a second circular groove 36 in which are located portions of the toggle levers 37 or equivalent flexible connecting means, such as chain links and the like and the outer ends of these levers are fastened within the collar 35 by means of lodging or anchoring pins 38 or their equivalent while the inner ends of said levers are pivoted by means of lodging or anchoring pins 39 between the two cooperating discs 40 and 41 fastened together by suitable fastening devices 42 and these discs are held in place upon the axle 43 by means of a pin 44 passing through said axle with its ends projecting beyond the circumference of said axle and seated in notches 45 in the inner faces of the discs.

If found desirable the discs may be splined to the shaft by suitable keyways and a key 46, as shown in Fig. 5. The use of the flexible connecting elements such as represented by the numeral 37 will cause the wheel to be revolved with the shaft 43 and during the revolving of said wheel will permit the axle to move diametrically or radially of the wheel rim as will be obvious.

In practice as a wheel constructed in this manner passes over a road bed the weight upon the hub of the wheel will cause the pistons below the hub to move outward, relative to the wheel as a whole, so as to compress the air in the cylinder and thus produce the same cushioning effect as that of a pneumatic tire. During this action the thrust blocks 32 of the horizontal or substantially horizontal spokes will slip over the curved surface of the tube 3 to compensate for the differences in position of the hub to the points of connection of the spokes with the wheel rim.

Of course I do not wish to be limited to the exact details of construction as herein shown as these may be varied within the limits of the appended claims without departing from the spirit of my invention.

Having thus fully described my invention, what I claim as new and useful is:—

1. A resilient wheel comprising a tube adapted to revolve about an axle, a barrel having holes therein surrounding said tube, flanges having threaded connection with the ends of said tube and bearing against the barrel, collars having threaded connection with the ends of the barrel and provided with grooves for registration with the aforementioned flanges, sockets mounted in the holes of the barrel between the collars, a wheel rim, cylinders detachably connected with said rim having threaded engagement with the sockets, pistons slidably mounted in said cylinders and provided with piston rods passing through the sockets, thrust blocks having threaded connection with the inner ends of the piston rods and loosely bearing upon the tube, and means excluding dirt or other foreign matter from the collars and their component parts.

2. A resilient wheel comprising a tube adapted to revolve about an axle, a barrel having holes therein surrounding said tube, flanges having threaded connection with the ends of said tube and bearing against the barrel, collars having threaded connection with the ends of the barrel and provided with grooves for registration with the aforementioned flanges, sockets mounted in the holes of the barrel between the collars, a wheel rim, cylinders detachably connected with said rim having threaded engagement with the sockets, pistons slidably mounted in said cylinders and provided with piston rods passing through the sockets, thrust blocks having threaded connection with the inner ends of the piston rods and loosely bearing upon the tube, means excluding dirt or other foreign matter from the collars and their component parts, a pair of coacting discs fixed to the axle and flexible means having connection with said discs and one of the collars whereby motion may be transmitted from the axle to the wheel.

3. A resilient wheel comprising a tube adapted to revolve about an axle, a barrel having holes therein surrounding said tube, flanges having threaded connection with the ends of said tube and bearing against the barrel, collars having threaded connection with the ends of the barrel and provided with grooves for registration with the aforementioned flanges, sockets mounted in the holes of the barrel and located between the collars, a wheel rim having lugs projecting from the inner surface thereof, cylinders having threaded connection with the aforementioned sockets and arranged in endwise alignment with the lugs on the rim, shims of a thickness substantially equal to the depth of the threaded connection of the cylinders with their sockets interposed between the outer ends of said cylinders and the lugs on the rim, union nuts on the cylinders for threaded connection with the lugs on the rim, pistons slidably mounted in said cylinders and provided with piston rods which pass through the sockets, and thrust blocks having threaded connection with the inner ends of the piston rods and loosely bearing upon the tube.

4. A resilient wheel comprising a tube adapted to revolve about an axle, a barrel having holes therein surrounding said tube, flanges having threaded connection with the ends of said tube and bearing against the barrel, collars having threaded connection with the ends of the barrel and provided with grooves for registration with the aforementioned flanges, sockets mounted in the holes of the barrel and located between the collars, a wheel rim having lugs projecting from the inner surface thereof, cylinders having threaded connection with the aforementioned sockets and arranged in endwise alignment with the lugs on the rim, shims of a thickness substantially equal to the depth of the threaded connection of the cylinders with their sockets interposed between the outer ends of said cylinders and the lugs on the rim, union nuts on the cylinders for threaded connection with the lugs on the rim, pistons slidably mounted in said cylinders and provided with piston rods which pass through the sockets, thrust blocks having threaded connection with the inner ends of the piston rods and loosely bearing upon the tube, liners with the cylinders and jackets surrounding the pistons.

In testimony whereof, I have hereunto affixed my signature.

THOMAS MORINELLI.